US006935327B1

(12) United States Patent
Williams et al.

(10) Patent No.: US 6,935,327 B1
(45) Date of Patent: Aug. 30, 2005

(54) HANDLE AND LIGHT ASSEMBLY FOR BARBECUE GRILLS

(75) Inventors: Benjamin M. Williams, Midland, GA (US); Wesley J. Wagner, Columbus, GA (US); James E. deBeers, Chicago, IL (US); Chris Labak, Shrewsbury, MA (US)

(73) Assignee: W.C. Bradley Company, Columbus, GA (US)

( * ) Notice: Subject to any disclaimer, the term of this patent is extended or adjusted under 35 U.S.C. 154(b) by 0 days.

(21) Appl. No.: 10/804,276

(22) Filed: Mar. 19, 2004

(51) Int. Cl.[7] ............................................. F24C 5/20
(52) U.S. Cl. ............................. 126/39 BA; 126/19 R; 126/275 R; 126/39 C; 126/410; 362/92
(58) Field of Search ..................... 126/39 BA, 19 R, 126/275 R, 39 CD, 85 A, 92 R, 213, 273 A; 362/92, 179

(56) References Cited

U.S. PATENT DOCUMENTS

| | | | |
|---|---|---|---|
| 2,129,339 A | * | 9/1938 | Turner ........................... 362/92 |
| 2,323,821 A | * | 7/1943 | Lindemann et al. ....... 126/39 C |
| 2,470,645 A | | 5/1949 | Reichart ...................... 99/421 |
| 2,809,282 A | | 10/1957 | Cripe et al. .................... 240/2 |
| 3,291,114 A | | 12/1966 | Melcalf ......................... 126/25 |
| 5,257,169 A | | 10/1993 | Walendziak ................. 362/92 |
| 5,676,045 A | | 10/1997 | Faraj ............................ 99/339 |
| 6,012,442 A | | 1/2000 | Faraj ............................ 126/39 |
| 6,073,623 A | | 6/2000 | Maschhoff .................... 126/25 |
| 6,079,843 A | * | 6/2000 | Latella et al. ................. 362/92 |
| 6,132,055 A | | 10/2000 | Grisamore et al. ........... 362/92 |
| 2003/0111070 A1 | * | 6/2003 | DeMars ..................... 126/25 R |

FOREIGN PATENT DOCUMENTS

DE    197 51 893    * 4/1999    ........... A47J 37/07

OTHER PUBLICATIONS

Bar-B-Que.com web site store item 345 displayed Mar. 2005.*

* cited by examiner

*Primary Examiner*—Stephen Gravini
(74) *Attorney, Agent, or Firm*—James W. Kayden; Thomas, Kayden, Horstemeyer & Risley, LLP

(57) ABSTRACT

A handle and light assembly for use on a barbecue grill. The assembly is inclusive of handle and at least one source of illumination for illuminating a cooking surface inside a hollow cooking chamber of the barbecue grill. The handle may function both as a means for opening a lid to access the cooking surface and also as a compartment for retaining the energy used to power the source of illumination. The lid includes at least one channel for the appropriate wiring to extend from the energy compartment to the illumination source. Accordingly, the handle may be located on the outside of the grill lid, and the source of illumination may be located inside the hollow cooking chamber.

17 Claims, 4 Drawing Sheets

HANDLE AND LIGHT ASSEMBLY FOR BARBECUE GRILLS

BACKGROUND

1. Field of the Invention

This invention relates to barbecue grills, and more particularly to a handle and integrated lighting system for illuminating the interior cooking chamber and cooking surface of a barbecue grill.

2. Discussion of the Related Art

Barbecue grills are well known and commonly used for outdoor cooking. With the proper ambient light, the food cooking on a barbecue grill is easily monitored by periodically inspecting the food for doneness or potential cooking problems. For example, grilled food is often inspected for excess charring. As in other methods of cooking, a food thermometer may be inserted into a food item periodically to check for doneness.

When a thermometer is not available, it is common practice to cut into a food item to inspect the color or texture at the center of the food item and determine doneness. Removing meat from the grill prematurely is particularly problematic because dangerous bacteria may reside in undercooked meat. This bacteria can cause serious illness in those who consume the undercooked meat.

The nature of grilling commonly places barbecue grills in locations that are frequently outside the range of nearby artificial illumination. Thus, when a grill is used at night, especially in poorly lit areas, cooking food to perfection can become challenging. Without the ability to properly inspect the food on the cooking surface of a grill, food may become excessively charred. Just as easily, food may be removed from the grill prematurely resulting in an undercooked and potentially harmful meal.

Accordingly, a need exists to rectify the issues associated with grilling in the absence of adequate external ambient light sources.

SUMMARY

Embodiments of the present invention include a cooking apparatus including a hollow cooking chamber and a lid pivotally connected to a firebox with a hinge. The cooking apparatus also includes a light assembly with an illumination enclosure within the hollow cooking chamber configured to house an illumination source. The cooking apparatus also includes a compartment on the outside of the hollow cooking chamber and affixed to the lid configured to house a source of energy used to energize the illumination source.

Another exemplary embodiment is directed to a cooking apparatus with a hollow cooking chamber. The cooking chamber includes a lid pivotally connected to a firebox with a hinge. The cooking apparatus also includes a light assembly with an enclosure disposed within the hollow cooking chamber for housing an illumination source. Further, the cooking apparatus includes a compartment on the outside of the hollow cooking chamber and affixed to the lid. This compartment is designed to house a source of energy to energize the illumination source.

Another exemplary embodiment includes a method of providing illumination to a cooking surface of a barbecue grill. The steps include modifying a grill handle to house a battery, attaching the grill handle to a grill lid, providing power from the battery to a light bulb disposed within a hollow cooking chamber of the grill, and shielding the light bulb when the grill lid is in a closed position. Further, the embodiment includes removing the shield from the light bulb when the lid is rotated to an open position to expose the light bulb and illuminate the cooking surface from above.

Another exemplary embodiment is directed to a barbecue grill with a hollow cooking chamber. The hollow cooking chamber includes a firebox with an attached grill lid. Further, a light assembly is provided that includes a light enclosure configured to house an illumination source. The light enclosure is disposed within the hollow cooking chamber. A shield is hingedly connected to the light enclosure to shield the illumination source when the grill lid is in a closed position and rotates to an open position to expose the illumination source and illuminate a cooking surface from above.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The invention is generally directed to a handle and light assembly for use on a barbecue grill. The assembly is inclusive of handle and at least one source of illumination for illuminating a cooking surface inside a hollow cooking chamber of the barbecue grill. The handle may function both as a means for opening a lid to access the cooking surface and also as a compartment for retaining the energy used to power the source of illumination. The lid includes at least one channel for the appropriate wiring to extend from the energy compartment to the illumination source. Accordingly, the handle may be located on the outside of the grill lid, and the source of illumination may be located inside the hollow cooking chamber.

Figure 1:
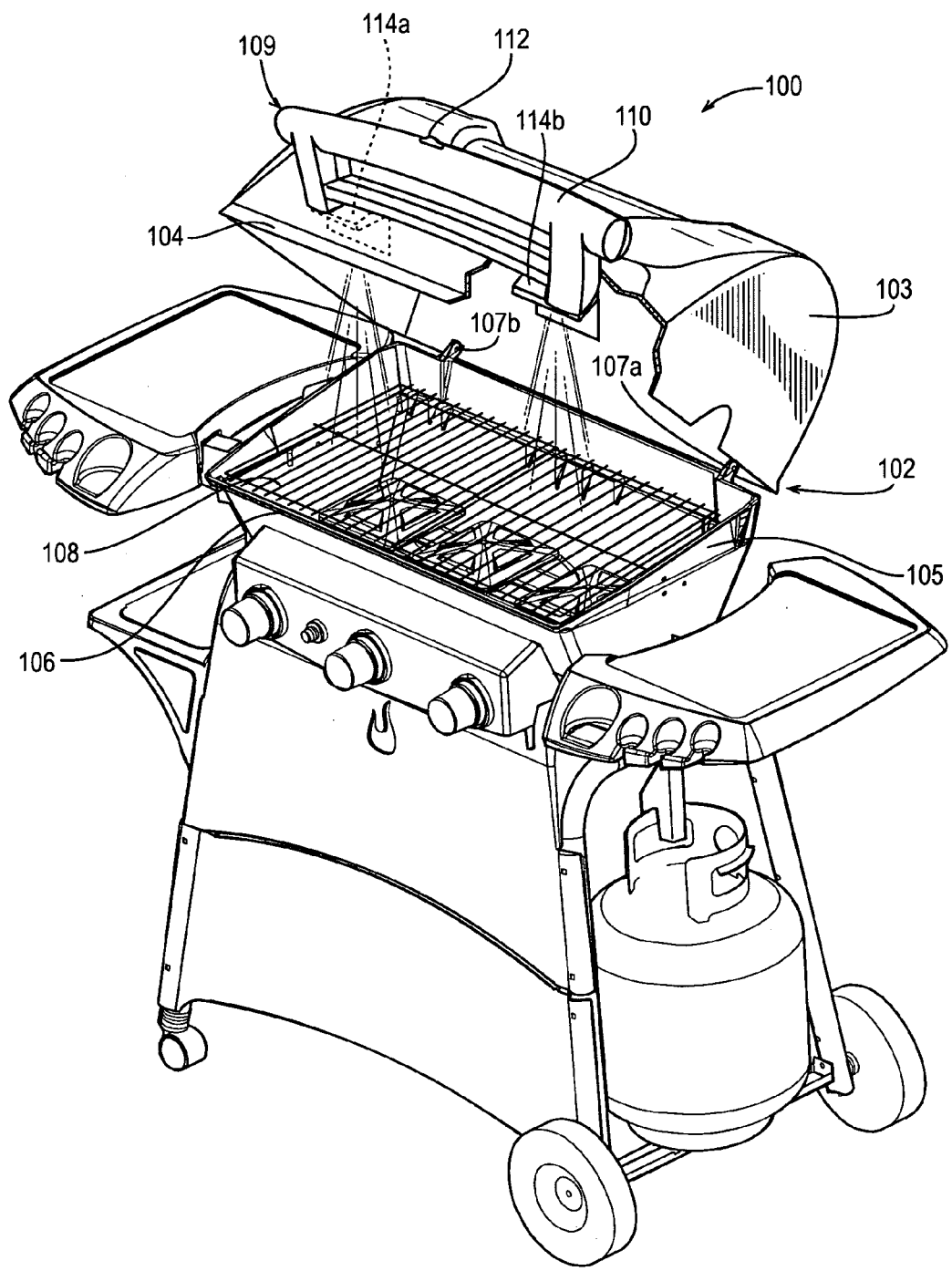
FIG. 1 is a perspective view of a barbecue grill incorporating a first embodiment of the grill lighting system with the lighting elements disposed on the interior of the cooking chamber.

FIG. 1 is a perspective view of a first embodiment of a barbecue grill 100 with which the present invention may be implemented. The barbecue grill 100 includes a hollow cooking chamber 102. Cooking chamber 102 is formed by the concave structure of lid 103 and firebox 105. Lid 103 is pivotally connected to firebox 105 about hinges 107a and 107b. As depicted in FIG. 1, lid 103 may be in an open position to reveal a cooking surface 108 inside the cooking chamber 102. Lid 103 may also be rotated about hinges 107a and 107b into a closed position to retain heat within the cooking chamber. In this closed position, lid leading edge 104 is drawn close to, and may actually rest upon, the firebox leading edge 106.

The grill light assembly 109 generally includes handle 110 and light enclosures 114a and 114b. The handle 110 is fastened to lid 103 and thus may be used to facilitate the opening of lid 103 to access the cooking surface 108. According to the preferred embodiment of FIG. 1, handle 110 is constructed of injection molded plastic. However, it will be apparent to one skilled in the art that handle 110 may be constructed of a variety of suitable materials. Preferably, the selected material should insulate the hand of a user from the heat generated within the cooking chamber 102 when opening grill lid 103.

Light enclosures 114a and 114b are disposed on the inside of lid 103, and thus are located inside cooking chamber 102. Accordingly, light enclosures 114a and 114b are constructed of a chrome plated steel, which offers protection from heat and other cooking hazards within the cooking chamber 102. The light enclosures 114a and 114b may be constructed of other various materials known in the art, but are preferably constructed of heat resistant materials to prevent melting or premature degradation.

When the grill is in the open position, as depicted in FIG. 1, food cooking on cooking surface 108 may be visually inspected to determine doneness. Flanges (not shown) on the lid 103 and/or cooking chamber 102 restrict rotation of lid 103 about hinges 107a and 107b such that the lid 103 is held open at an angle that positions light enclosures 114a and 114b over the cooking surface. From this lid position illumination may be directed from an illumination source within light enclosures 114a and 114b onto the cooking surface 109. Power switch 112 is preferably located on handle 110 and provides the ability to turn the illumination source on or off. One skilled in the art will appreciate that power switch 112 could also provide dimming capabilities to adjust the illumination brightness.

Figure 2:
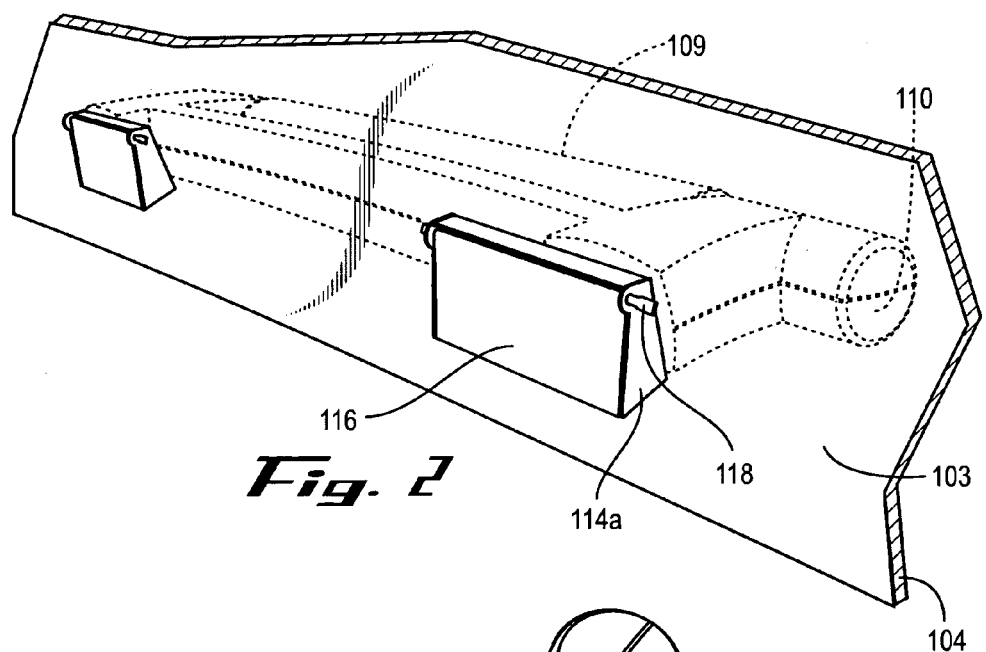
FIG. 2 is a close-up, perspective view of the grill lighting system of FIG. 1, with a view from the interior of the hollow cooking chamber, while the grill lid is in a substantially closed position.

Turning now to FIG. 2, the grill light assembly 109 of FIG. 1 is viewed from inside the cooking chamber 102 with the lid 103 in a substantially closed position. In contrast to FIG. 1, lid 103 is depicted as having been rotated about hinges 107a and 107b such that lid 103 is closed in relation to firebox 105. In this position, the food on cooking surface 108 is substantially inaccessible. Accordingly, when lid 103 is in this position, illumination is generally not needed. From this perspective, handle 110 is behind the lid 103, and light enclosures 114a and 114b are now clearly visible in the foreground. As shown, light enclosures 114a and 114b are designed to be located on the inside of the hollow cooking chamber 102. Handle 110 is located on the outside of the cooking chamber 102 and attached to lid 103. Thus, lid 103 is sandwiched between light enclosures 114a and 114b and handle 110.

According to this embodiment, light enclosures 114a and 114b are substantially similar in all respects, thus any description as to light enclosure 114a applies equally to 114b. Here, light enclosure 114a includes a light bulb shield 116. The light bulb shield 116 is hingedly attached towards the top of the light enclosure 114a by a shield hinge 118. Thus, as shown in FIG. 2, when grill lid 103 is in the closed position, the force of gravity maintains bulb shield 116 in a substantially closed position in relation to the walls of the light enclosure.

Figure 3:
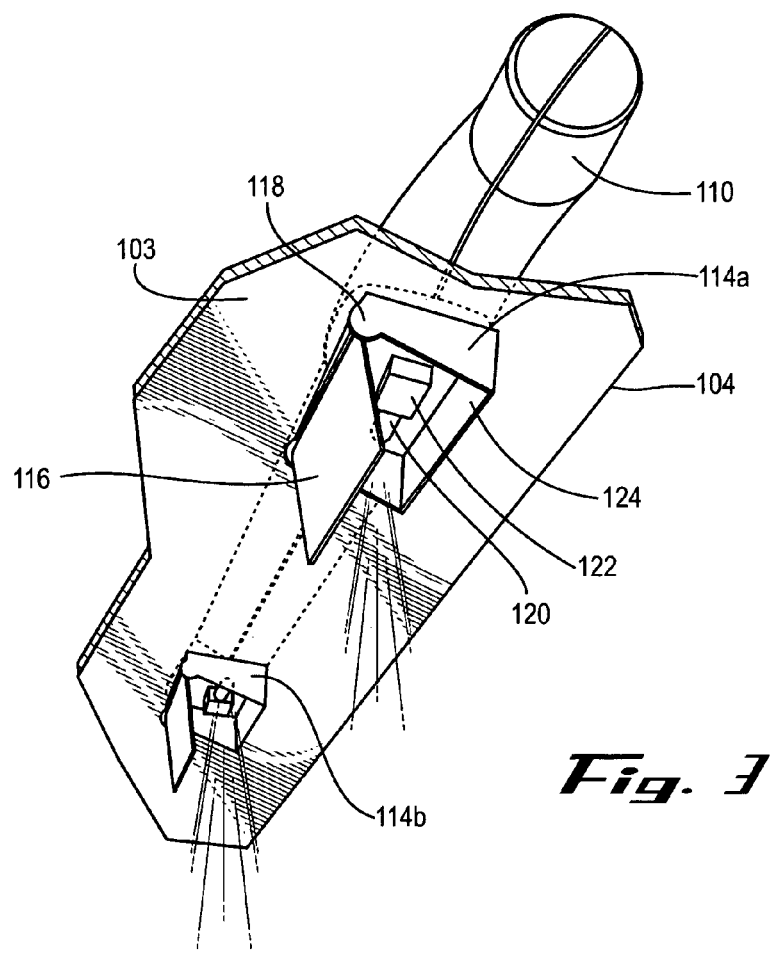
FIG. 3. is a close-up, perspective view of the grill lighting system of FIG. 1, with a view from the interior of the hollow cooking chamber, while the grill lid is in a substantially open position.

FIG. 3 depicts the grill light assembly of FIG. 1 and FIG. 2 when the lid 103 is in a substantially open position (as in FIG. 1). Here, in contrast to FIG. 2, lid 103 is rotated about hinges 107a and 107b (FIG. 1) by lifting handle 110. As the lid 103 rotates about hinges 107a and 107b, light bulb enclosures 114a and 114b are lifted up and over the cooking surface 108. In doing so, the gravitational force pulls light bulb shield 116 to an open position by rotating about the shield hinge 118, thereby revealing and exposing an illumination source within the light enclosure 114a. An illumination source can be any means for illuminating the cooking surface 108 or the interior of the cooking chamber 102. For example, the illumination source may be a flame, a resistive electrical element, light emitting diodes (LED), or as depicted in FIG. 3, an incandescent light bulb 120. Bulb receptacle 122 forms a socket to secure light bulb 120 into place within the light bulb enclosure 114a.

As is common in barbecue grills, the heat source used for cooking is typically located in the firebox 105 (FIG. 1). For example, the heat source may be charcoal briquettes, gas burners, or electrical heating elements. Looking back to FIG. 2, light bulb shield 116 provides protection to light bulb 120 (FIG. 3) while the grill lid 103 is in the substantially closed position. Thus, light bulb shield 116 covers the light bulb 122 and provides protection from heat and splattering cooking residue when the light bulb 120 is closest to the heat source.

In contrast, when lid 103 is rotated to the open position as depicted in FIG. 1 and FIG. 3, the bulb 120 is positioned safely away from the heat source. Thus, the light bulb shield 116 is no longer required to shield the light bulb 120 from the intense heat and splattering cooking residue. In this open position, light bulb shield 116 no longer covers the light bulb 120. Thus, cooking surface 108 is capable of being illuminated by the exposed light bulb 120. In this embodiment, the illumination from bulb 120 is provided from over and above the cooking surface 108. In this position, the illumination provides minimal shadows and easily accommodates reading a food thermometer despite the dim ambient light.

Figure 4:
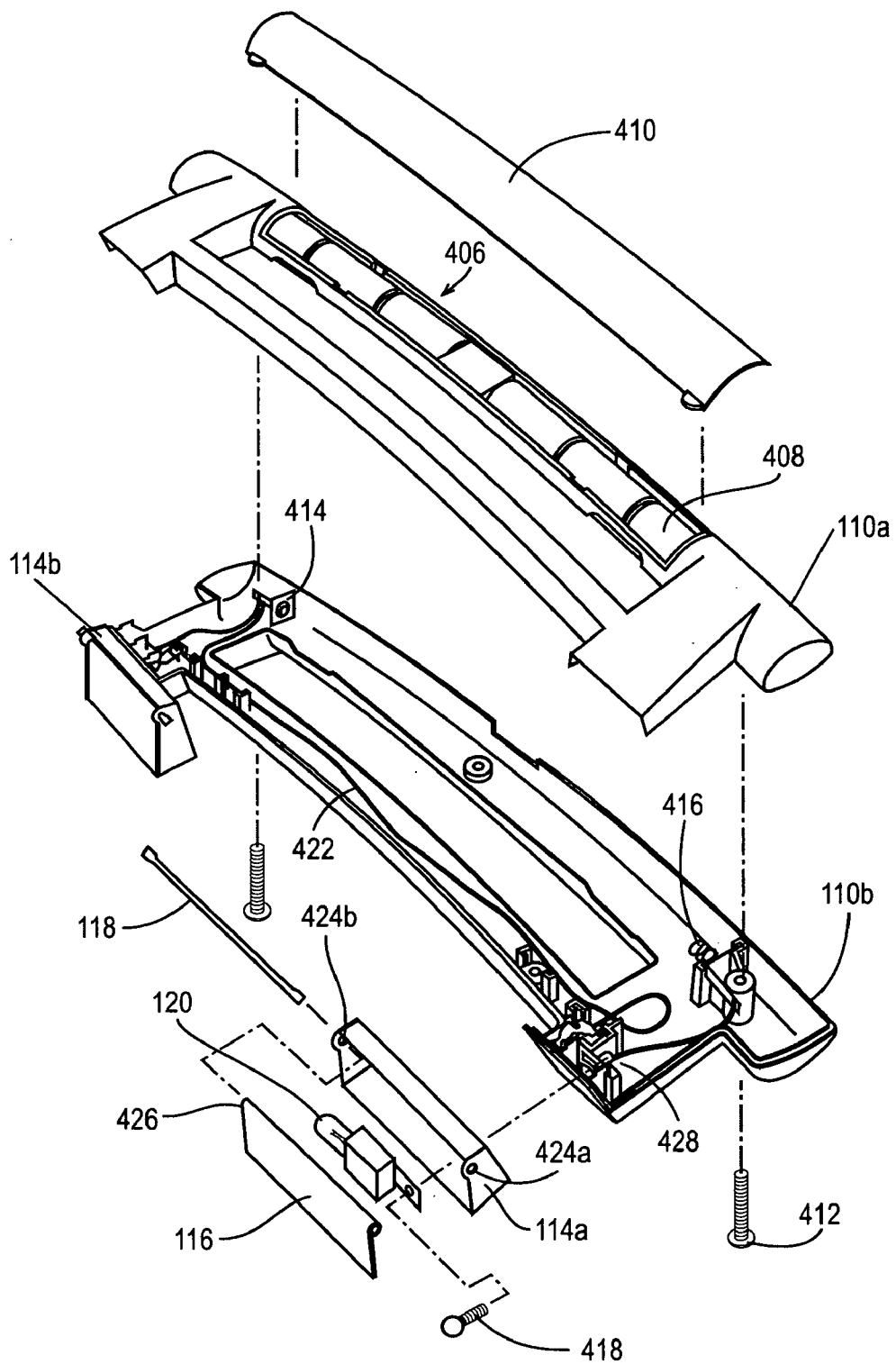
FIG. 4. is an exploded view of the grill light assembly.

FIG. 4 depicts an exploded view of the grill light assembly 109. Handle 110 includes an energy retaining portion 110a and a wiring portion 110b. Energy retaining portion 110a includes a battery compartment 406 for holding one or more batteries used to power the light bulb 120. Battery compartment lid 410 snaps into energy retaining portion 110a to retain the batteries 408 within the battery compartment 406. While FIG. 4 depicts that battery compartment lid 410 includes tabs which snap into energy retaining portion 110a, depending on design preferences and cost, battery compartment lid 410 may also be secured to energy retaining portion 110a using any other suitable fasteners. For example, a suitable fastener may be a screw or a nut and bolt assembly. Wiring portion 110b includes a positive terminal 414 and a negative terminal 416 for connecting electrical wiring 422 to the electrical terminals of batteries 408. Electrical wiring 422 forms an electrical circuit running from the positive terminal 414 to light enclosure 114a, then to enclosure 114b, through power switch 112 (FIG. 1) and back to negative terminal 416. Power switch 112 is used to connect and disconnect the circuit to provide the associated activation and deactivation of the power source for light bulb 120. Energy retaining portion 110a and wiring portion 110b are fastened by screwing threaded handle screws 412 into a threaded receiving receptacle in the energy retaining portion. Light bulb shield 116 is connected to light enclosure 114a by threading hinge 118 through holes 424a and 424b in the light enclosure 114a and the channel 426 formed at the top of shield 116. A threaded bolt 418 secures the light bulb receptacle and the light enclosure to a receiving receptacle 428 in the wiring portion 110b of handle 110. In a typical integration with a barbecue grill, grill lid 103 is sandwiched between enclosure 114a and wiring portion 110b. Accordingly, bolt 418 firmly fastens the grill light assembly 108 to the lid 103 through an aperture in the grill lid (not shown).

Although power switch 112 of the present embodiment is used to manually activate and deactivate the power source to bulb 120, other devices may be configured to automatically activate and deactivate the power based on the position of the grill lid 103 or the position of the light bulb shield 116. For example, in practice, the illumination is typically only needed when the cooking surface is accessed by opening grill lid 103 to the open position. Thus, an automatic switch may be implemented to complete the circuit and energize the light bulb 120 when the lid 103 is in the substantially open position, and disconnect the circuit when lid 103 is in the substantially closed position. Likewise, an automatic switch may enable power to the light bulb 120 based on the position of the light bulb shield 116. For example, when the light bulb shield 116 is in the closed position, the switch may automatically disable power to the light bulb 120. When the light bulb shield 116 is in the open position, the switch may automatically enable power to the light bulb 120. When using an automatic switch for activating and deactivating the grill light, it is also beneficial to employ light sensing technology to measure a threshold level of ambient light before activating the power source. For example, a photocell circuit may be used to detect the ambient light and conserve energy by enabling power to light bulb 120 when the ambient light is of such low levels that cooking surface 108 is poorly lit.

Figure 5:
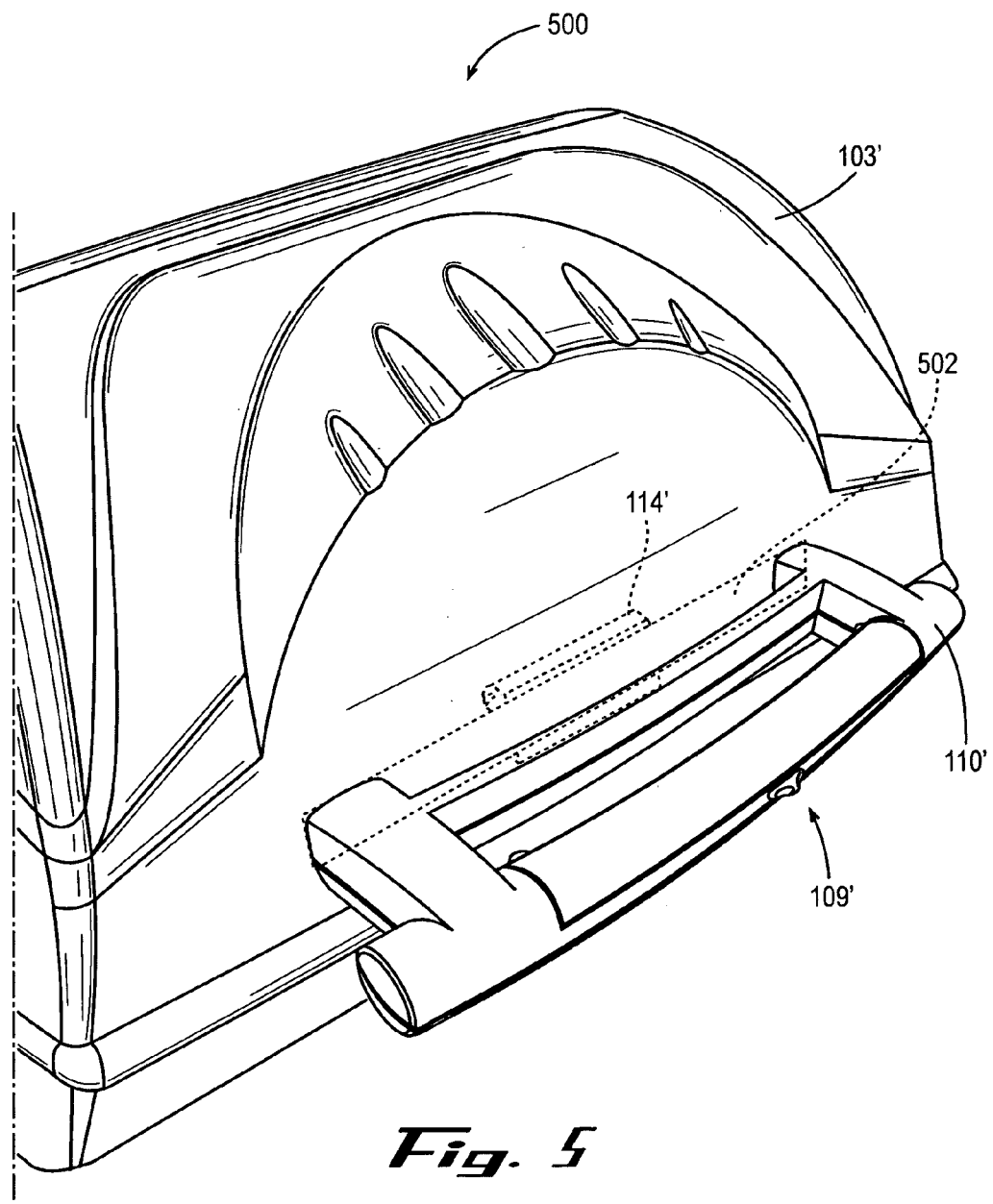
FIG. 5 is a perspective view of a barbecue grill incorporating a second embodiment of the grill light using a single light housing disposed on the interior of the hollow cooking chamber.

According to a second embodiment shown in FIG. 5, barbecue grill 500 may contain a grill light assembly 109' using a single light enclosure 114' extending the width of the handle 110'. A bracket 502 may be used to mount a light enclosure within the grill top 103'. One skilled in the art would realize that any number of light bulbs and light bulb enclosures may be used, as this would be a matter of design preference.

In yet another embodiment, each of the light bulb shields may be physically secured in the substantially closed position, regardless of the lid position, until the shields are released. This embodiment may be used to limit the exposure of the light bulb to heat, smoke, and cooking residue when the grill lighting system is not being used to illuminate the cooking surface. For example, light bulb shield 116 may be secured in the substantially closed position by a spring loaded release tab which is positioned to prevent light bulb shield 16 from rotating about shield hinge 118 when lid 103 is rotated to the open position. In addition to activating and deactivating the power source to bulb 120, power switch 112 may also operate a cable release attached to the spring loaded release tab. Thus, when power switch 112 is activated the cable release biases the spring loaded release tab to a position that allows light bulb shield 116 to freely move about shield hinge 118. Thus, the light bulb shields are released at substantially the same time as the moment that power is supplied to the light bulbs. Other embodiments, such as those using manually releasable tabs or other suitable fasteners that prevent the light bulb shields from opening when the lid is opened may be used. Preferably, these fasteners would be easily released when the grill light is used to illuminate the cooking surface.

Although the description above contains several specific embodiments, these embodiments should not be construed as limiting the scope of the invention but as merely providing illustrations of some of the presently preferred embodiments of this invention. Thus the scope of the invention should be determined by the appended claims and their legal equivalents.

Therefore, having thus described the invention, at least the following is claimed:

1. A barbecue grill comprising:
    a hollow cooking chamber including a firebox and a grill lid pivotally connected to the firebox with a hinge;
    a light assembly including:
        a light bulb enclosure disposed within the hollow cooking chamber and configured to house a light bulb;
        a handle disposed on the outside of the hollow cooking chamber and configured to be affixed to the grill lid, the handle including:
            a battery compartment with at least one battery for providing power for the light bulb.

2. The grill lid of claim 1, wherein the grill lid is rotatable about the hinge between a first substantially closed position and a second substantially open position.

3. The grill of claim 1, wherein the light bulb is positioned over the cooking surface when the grill lid is in the second open position.

4. The handle of claim 1, further including a switch and an electrical circuit between the at least one battery and the light.

5. The light assembly of claim 2, further including a light bulb shield pivotally connected to the light bulb enclosure with a second hinge and positioned to shield the light bulb when the grill lid is in the first substantially closed position.

6. The light assembly of claim 2 further including a light bulb shield pivotally connected to the light bulb enclosure with a second hinge, the light bulb shield positioned to allow illumination from the light bulb to illuminate a cooking surface from above when the grill lid is in the second substantially open position.

7. The grill of claim 1, wherein the grill lid is sandwiched between the handle and the light enclosure.

8. A cooking apparatus, the cooking apparatus comprising:
    a hollow cooking chamber including a lid pivotally connected to a firebox with a hinge,
    a light assembly including:
        an enclosure disposed within the hollow cooking chamber configured to house an illumination source;
        a compartment disposed on the outside of the hollow cooking chamber and affixed to the lid, the compartment configured to house a source of energy used to energize the illumination source.

9. The light assembly of claim 8, wherein the illumination source is selected from the group consisting of a light bulb and a resistive electrical element.

10. The cooking apparatus of claim 8, wherein the enclosure is a handle.

11. The light assembly of claim 8, wherein the illumination source is a light bulb, the compartment is a battery compartment, and the source of energy is at least one battery.

12. The cooking apparatus of claim 8, wherein the source of energy is a battery.

13. A method of providing illumination to a cooking surface of a barbecue grill comprising:
    modifying a grill handle to house a battery;
    attaching the grill handle to a grill lid;

providing power from the battery to a light bulb disposed within a hollow cooking chamber of the grill;

shielding the light bulb when the grill lid is in a substantially closed position; and exposing the light bulb when the lid is rotated to a substantially open position.

14. A barbecue grill comprising:
a hollow cooking chamber including:
   a firebox; and
   a grill lid hingedly attached to the firebox; and
a light assembly including:
   a light enclosure configured to house an illumination source, the enclosure disposed within the hollow cooking chamber; and
   a shield hingedly connected to the light enclosure and operable to shield the illumination source when the grill lid is in a first closed position and to hingedly rotate to a second substantially open position to expose the illumination source and illuminate a cooking surface from above.

15. The barbecue grill of claim 14, further including a handle disposed on the outside of the hollow cooking chamber, the handle including a source of energy used to energize the illumination source.

16. The barbecue grill of claim 15, wherein the grill lid is sandwiched between the handle and the light enclosure.

17. The handle of claim 15, further including a switch in an electrical circuit between the illumination source and the source of energy.

* * * * *